Feb. 1, 1955 C. E. CUSHMAN Re. 23,933
CONTROL LINE COMPENSATING APPARATUS
Original Filed Dec. 27, 1946 6 Sheets-Sheet 1
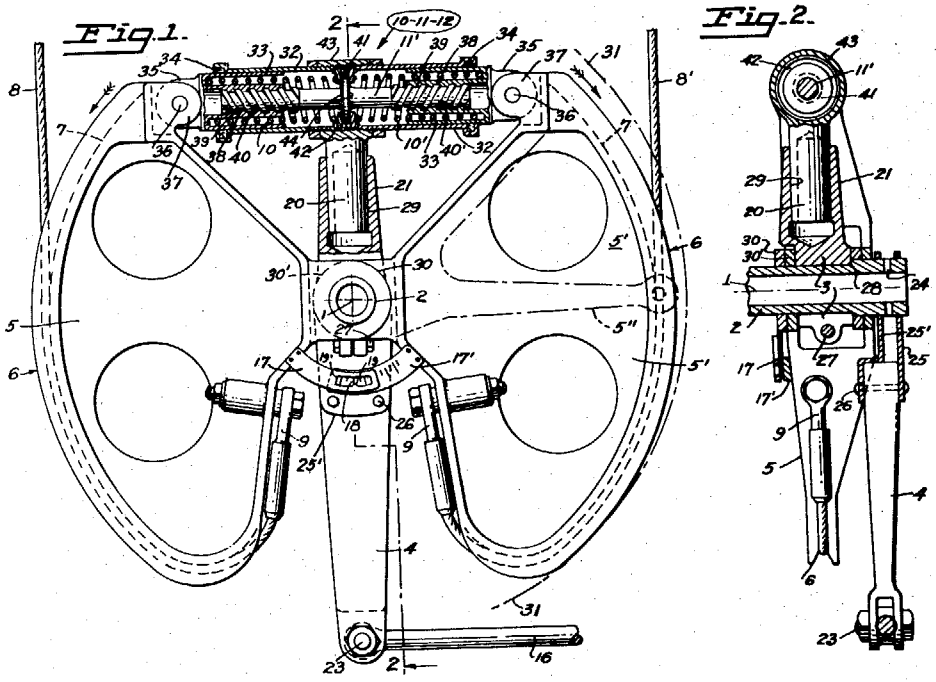
Inventor
Clifford E. Cushman
By Paul B. Hunter
Attorney

CONTROL LINE COMPENSATING APPARATUS

Original Filed Dec. 27, 1946 6 Sheets-Sheet 2

Inventor
Clifford E. Cushman

By Paul B. Hunter
Attorney

Feb. 1, 1955 C. E. CUSHMAN Re. 23,933

CONTROL LINE COMPENSATING APPARATUS

Original Filed Dec. 27, 1946 6 Sheets-Sheet 3

Inventor

Clifford E. Cushman

By Paul B. Hunter

Attorney

CONTROL LINE COMPENSATING APPARATUS

Original Filed Dec. 27, 1946 6 Sheets-Sheet 4

Inventor
Clifford E. Cushman

By Paul B. Hunter
Attorney

CONTROL LINE COMPENSATING APPARATUS

Original Filed Dec. 27, 1946 6 Sheets-Sheet 5

Inventor
Clifford E. Cushman

By Paul B. Hunter
Attorney

CONTROL LINE COMPENSATING APPARATUS
Original Filed Dec. 27, 1946 6 Sheets-Sheet 6
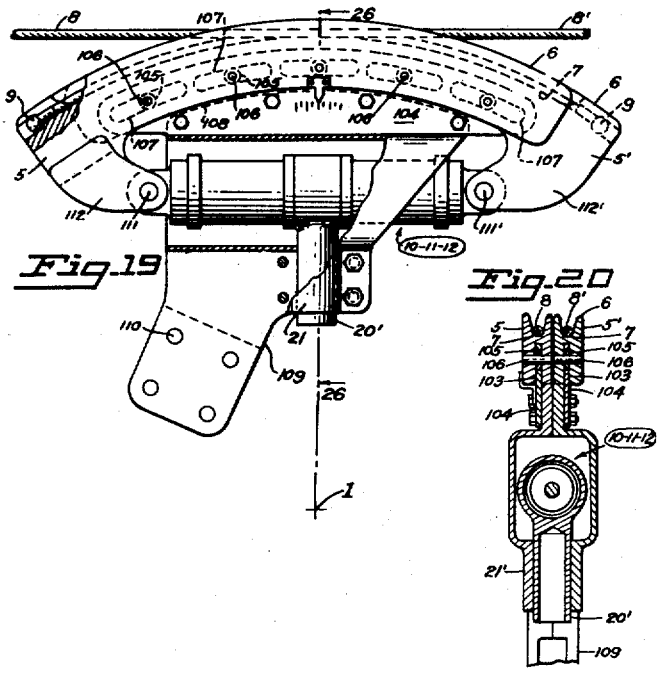
Inventor
Clifford E. Cushman
By Paul B. Hunter
Attorney United States Patent Office Re. 23,933

Reissued Feb. 1, 1955

23,933

CONTROL LINE COMPENSATING APPARATUS

Clifford E. Cushman, Burbank, Calif., assignor to Sturgess, Inc., Glendale, Calif., a corporation of California Original No. 2,581,080, dated January 1, 1952, Serial No. 718,677, December 27, 1946. Application for reissue December 28, 1953, Serial No. 400,824

29 Claims. (Cl. 74—501.5)

Matter enclosed in heavy brackets [ ] appears in the original patent but forms no part of this reissue specification; matter printed in italics indicates the additions made by reissue.

This invention relates to apparatuses for regulating the tension in and compensating for variations in length of control lines as used in the remote control of various devices required to be moved one way or the other, from a distant point, such as semaphore signals, machine controls, engine controls and the various control lines used to operate different parts of air craft such as rudders, ailerons, elevators, etc., and also the throttles of the engines, as well as all similar purposes.

As such remote controls are carried out by the use of ropes, cables, wires, rods, links, chains, etc., or a combination of such devices, sometimes of great length, and which are all subject in various degrees to expansion and contraction, stretch, wear, etc. in use, they are all embraced in the words "lines" or "control lines" as used herein.

The principal object of the invention is to provide improved apparatus or devices for compensating or regulating such control lines to insure proper transmission of the control forces at all times for the desired purpose.

Specific features and advantages of the improvements will appear in the following description and in the accompanying drawings.

For a clear understanding of the drawings to be described, the apparatus may be said to generally comprise a pair of relatively movable arcuate members or levers to which the control lines are respectively applied, and which members are urged in opposite directions as by a spring to maintain the desired rig tension in the control lines, and preferably there is some coordinating means insuring their substantially equal movement in opposite directions in compensating the lines, and generally some clutching means automatically holding said members against relative movement other than substantially equally in such opposite directions, and whereby any substantial unequal stresses in the lines will result generally in so holding said members, only during such unequal stresses.

The movable members or levers preferably are arranged to move in arcuate paths and generally constitute arms or levers swinging about an axis, preferably the axis of a work shaft to be turned by the movement of the levers upon operating the control lines for transmission of the forces for the required purpose, or in some other manner hereinafter explained.

With the above explanation the figures of the drawings may be briefly described as follows:

Fig. 1 is a side view of a control line compensator with a portion (shown in section) to show the spring, brake and synchronizer, and showing the principal features above briefly outlined, and with a pair of control cables attached to the movable "levers," or arcuate members.

Fig. 2 is a vertical cross section of Fig. 1.

(All the above figures indicate a "screw" type synchronizer with brake or clutch to hold the levers against relative movement.)

Figure 10:
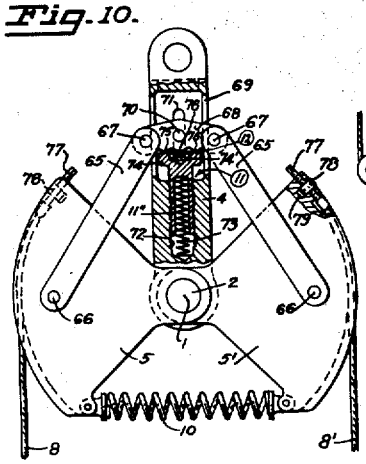

Fig. 10 shows a control line compensator of the type outlined but with a modified form of the screw synchronizer and brake.

Figure 6:
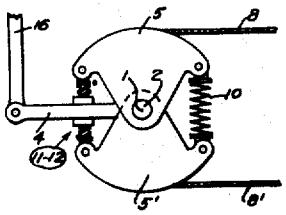
Fig. 6 is an outline drawing showing a modified arrangement of the principal parts and with the "levers" in the form of solid segments embracing about a third of a circle each.
Figure 11:
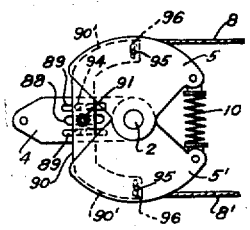

[Fig. 11 shows a general construction similar to that of Fig. 6 but with a different kind of clutch or second species generally termed herein a "wedge clutch" comprising a "crossed groove or slot clutch" housing a loose ball or pin, the ball being here indicated.]

Figure 7:
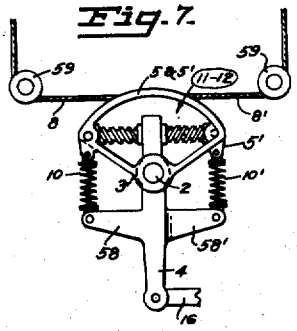
Fig. 7 shows another modification of the form and arrangement of the principal parts with the movable members or levers in the form of open sided quadrants, indicated in intermediate compensating position, one directly behind the other.
Figure 12:
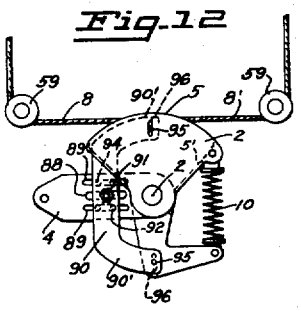

[Fig. 12 shows a general construction similar to that of Fig. 7 but shows a crossed slot clutch with a loose pin in the slots.]

Figure 8:
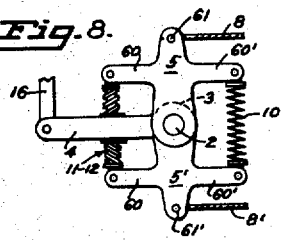
Fig. 8 shows another modified form of the movable elements wherein the levers each take the form of a cross, with the rig spring operating between two of the cross arms and the synchronizer between the opposite pair of arms of the cross, the central arms of the cross being the main portion of the levers to which the control lines are attached.
Figure 13:
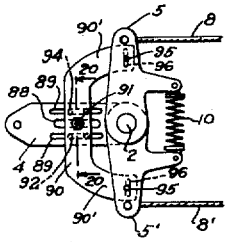

[Fig. 13 shows a general construction similar to that of Fig. 8 but omitting the synchronizer, and using the wedge grip clutch.]

Figure 14:
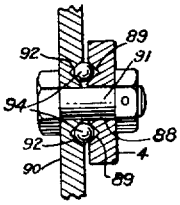

[Fig. 14 shows a further modified form of the lever elements and incorporating the wedge grip clutch.]

Figure 15:
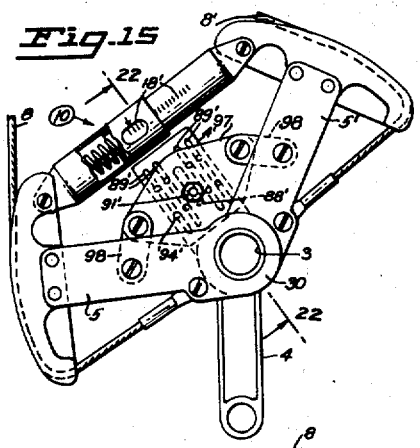

[Fig. 15 is an enlarged cross sectional detail taken along the line 15—15 of Fig. 11 showing the ball in the crossed or wedging grooves.]

Figure 16:
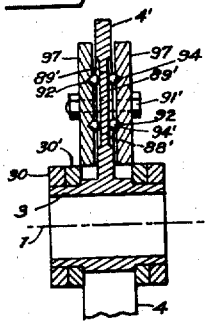

[Fig. 16 is a view similar to that of Fig. 15 but taken along the line 16—16 of Fig. 12 showing the pin in the crossed or wedging slots.]

Figs. *11* [17] to *13* [19] show a third species of clutch generally termed herein a ball cam clutch.

Fig. [17] *11* shows a structure similar to that of Fig. 6 but employing the ball cam clutch in place of the screw synchronizer and brake of Fig. 6.

Fig. [18] *12* shows a structure similar to that of Fig. 7 but uses a ball cam clutch to require both substantially synchronous movement of the levers in opposite directions as well as to clutch them against movement upon substantially unequal stresses being applied by the control lines.

Fig. [19] *13* shows an arrangement with the levers extending diametrically opposite one another, similarly to the showing of Fig. 8 but employing the ball cam clutch.

Fig. [20] *14* is an enlarged sectional detail of the ball cam clutch taken along the line 20—20 of Fig. 19.

Figure 5:
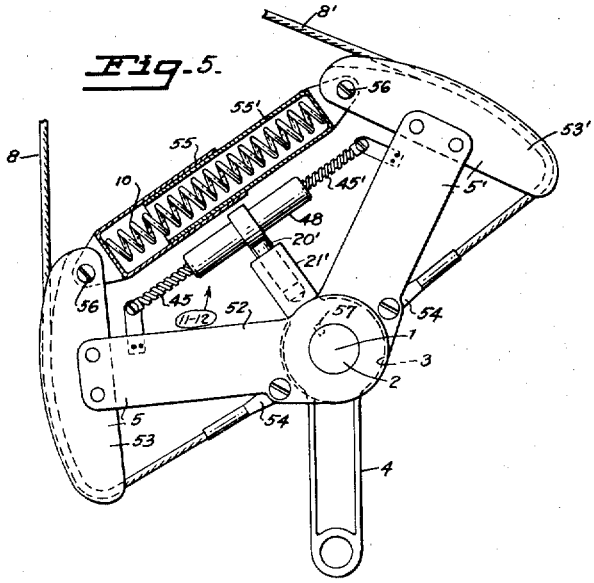
Fig. 5 is a view similar to that of Fig. 1 showing a modified form of the movable members or levers, and independent arrangement of synchronizer and telescopically enclosed rig tension spring, and also indicates the offset or side by side relation of the levers.

Fig. [21] *15* shows one of the control line compensators similar to that of Fig. 5 but employing the ball cam clutch and the telescopic tube enclosed rig spring.

Fig. [22] *16* is a cross section taken along the line 22—22 of Fig. [21] *15*.

Fig. *17* [23] is a side view of a compensator similar in arrangement to that shown in Fig. [17] *11* also employing the ball cam clutch, but concealing the rig spring within the contour of the segment or quadrant form of the levers.

Fig *18* [24] is a detached view of the work arm and rig spring arrangement of Fig. [23] *17* and also indicating the elements of the ball cam clutch cooperating with the work arm.

Fig. [25] *19* shows an arrangement of parts wherein the oppositely movable members are both movable along the arcuate periphery of but one lever or frame member to which they are clutched or held relatively immovable upon unequal control line stresses being applied to the oppositely movable members.

Fig. [26] *20* is a vertical cross section of Fig. [25] *19* taken along the line 26—26 thereof.

[Fig. 27 shows one of the compensators with screw synchronizer, but no rig springs, hooked up to push-pull lines as particularly useful in remote engine control operation.]

Before going into a more detailed description of the drawing figures it may be stated that the present apparatus, while it functions generally to compensate or regulate the control lines as do the prior patents of the assignee corporation hereof, such as Patents Nos. 2,280,105, 2,280,106, 2,363,228, 2,363,229, 2,371,130, 2,399,739 and 2,405,377, it is based on a generic or fundamentally different operating construction from any of them, and which new operative construction may itself embrace specifically different "coordinating means" or what may loosely be termed "integrating clutch systems," all of which are claimed generically herein, and three of which are specifically claimed herein, and each of which three specific systems are themselves capable of variations into what may be termed "sub-species" of the three main species, and some of these possible variations are shown in the drawings and described herein.

In its most complete or most specific form, the apparatus may incorporate all of the following features:

The movable members may each be of the pivoted lever form, embracing any degree of arc about which it swings, from a simple straight lever, through a relatively wide lever, a segment, quadrant, or any greater portion of the circle, either as to the whole body of the lever or any arcuate extension of its outer "end" or periphery, and its arcuate periphery may be concentric or eccentric to its pivotal arc of travel, and may be provided on such periphery with a guiding groove in which the control line or cable seats. A spring is provided to resiliently urge the pivoted levers in opposite directions to impart the desired rig tension to the control lines respectively attached or secured to the levers. Also there may be a hub, and/or a "work" arm to which the "levers" are clutched or held as a unit therewith during periods of unequal stresses being applied to the levers, and which hub or work arm receives or delivers the forces transmitted by or to the control lines, as by a push-pull rod, and this hub or work arm may be mounted on a shaft for general revolvable support of the assemblage, or secured to the shaft for further transmission of the forces received from or delivered to the control line or lines. Also, the means which clutches or holds the levers against relative movement upon unequal stresses being applied to them may also incorporate means requiring the levers to move substantially synchronously in opposite directions upon substantially even stresses being applied, and may during the normal action of compensation for elongation and contraction of the control lines actually force or positively urge the levers to so move.

For certain types of installations and results required, some of the features enumerated above may be dispensed with or modified. Thus, there need be no synchronizer, [or if there is there need be no clutch. In some cases no spring is required,] in other uses no arcuate guides on the levers for the control lines, as where the "levers" are simple without arcuate outer ends.

Also, the clutch [if] used, may be of various types, [three] only of which are shown in the drawings and specifically claimed herein, namely the screwbrake type, [the "wedge grip" ball or pin type], and the "ball cam" type, tho numerous others may be readily devised by those skilled in the art.

Figs. 1 and 2 of the drawings show one of the control line compensating devices made in accordance with the invention and incorporating all of the features broadly above set out, but using the screw brake type of clutch. The levers shown are pivoted on the axis of the shaft, and the bodies of the levers are of the form of segments of the circle along the arc of which they swing, but as stated their bodily form may incorporate any desired amount of the circle, from a straight lever to a whole circular disk, particularly as they may be arranged offset or side by side so as to pass each other over some areas in swinging. Hence, the broader claims made herein must be taken to cover all of these variations.

Since the variation in general form and arrangement of the principal elements of the compensator are so very numerous as indicated by the 27 figures of the drawings required to illustrate but some of the still greater number of variations possible, it is thought best for clarity and quick comparison of the various forms shown to use the same identifying numerals on the same functioning features of all of the showings rather than otherwise priming the numerals, as such a long row of prime marks as would otherwise be required would be very confusing, and in the detailed description the figures number being described will be clearly indicated to prevent any confusion as to which particular modified form or ararngement is under consideration.

The main parts shown in [all of] the figures of the drawings will therefore be designated as follows:

1—Principal axis of rotation.
2—Shaft.
3—Hub.
4—Work arm.
5 and 5'—Oppositely movable members or levers to which the control lines are attached.
6—Arcuate outer periphery of members 5.
7—Control line guiding grooves in 6.
8 and 8'—Control lines.
9—Control line attachment means.
10—Rig tension springs.
11—Screw synchronizer assembly.
12—Screw synchronizer clutch or brake.
[13—Wedge clutch with ball.]
[14—Wedge clutch with pin.]
15—Ball cam clutch.
16—Push-pull rod.
59—Idler pulleys.

All other parts and details will bear other individual numerals or prime marks.

In Figs. 1 and 2 the compensator comprises a shaft 2 upon which is mounted a pair of movable members or arcuate segment form levers 5 and 5' free for limited swinging movement about the shaft, and which members are resiliently urged to move in opposite directions by a spring or springs 10 to maintain a predetermined "rig" tension in the control lines 8 and 8' which are here shown as cables and respectively attached at their ends as at 9 each to one of the members 5, 5' and are seated in guiding grooves 7 formed along the arcuate peripheries 6 of the members, thus as the cables contract or expand due to temperature changes or other causes, the segments will slowly turn slightly in opposite directions to "play out" or "take up" the cables to maintain the desired "rig" tension.

However, as a working pull applied to either cable might exceed the force of the rig spring many times, means is provided, effective upon such pull on either cable, to clutch or hold the segments together as a unit against relative turning so that the working pull on the cables will be transmitted directly through the segment involved to the shaft; as through a lever equal in length to the radius of the segment; for direct turning of the shaft, and thus by-passing the rig spring.

Besides the above, it is desirable that some means be incorporated to insure or force the segments to move substantially synchronously in their oscillatory cable compensating movements. In Fig. 1 these three features—rig spring 10, clutch or brake 12, and synchronizer 11, are all combined in one assembly, all enclosed in a telescopic tube covering, and designated generally on the figure by the combined numerals 10—11—12 encircled, and which will be described in detail to follow, but it may here be stated that the clutch feature is stabilized by an arm or stem 20 which slides radially in a tubular guide or boss 21 extending outwardly from a hub 3 rigidly secured to the shaft 2, and that a work arm 4 is also in fixed relation to the shaft and hub and all of which form a substantially rigid unit when the clutch is applied, so that any working force applied to either cable will be directly transmitted through the assembly to the shaft or to the work arm, or vice versa.

If the work arm 4 is used it may be pivotally linked to a push-pull rod 16 as indicated at 23, and which may be either at the receiving end of the control line, or at the delivery end for moving the work.

In further detail, in Figs. 1 and 2, the shaft 2 is shown hollow or tubular and provided with a hole 24 for pinning it to a solid shaft if desired. The work arm 4 is in this showing secured to the outer end of the hollow shaft as by spaced sheet metal bracket members 25, 25', welded or otherwise to the hollow shaft and riveted as at 26 to the work arm, tho in other designs the work arm may be secured to or formed integral with the hub 3 as will be described for some of the other figures of the drawings.

In Fig. 2 the hub 3 is a clamp hub non-rotatably clamped to the hollow shaft 2 by means of a bolt 27 and positioned against a shoulder on the shaft as at 28 to accurately position it, and the hub boss 21 provided with a radial bore 29 to form a stabilizing guide for the screw synchronizer clutch or brake stem 20.

The oppositely movable members or levers 5, 5' of Figs. 1 and 2 take the shape substantially of segments of a circle somewhat greater than quadrants and are each independently pivoted upon the hollow shaft 2 by what may be termed double hub-plates 30 and 30' which straddle the relatively fixed hub 3 as shown in Fig. 2 so that the members 5, 5' are free to swing back and forth on the hollow shaft within the limits prescribed by the remaining structure.

The peripheries 6 of the segment type levers are here shown arcuate, and while they may be and usually are concentric with the axis 1 about which they swing, in the present showing they are somewhat eccentric to this axis in becoming of lesser radius toward their upper portions as indicated by comparison with circular dotted line 31 for the purpose of compensating in leverage on the control lines as the rig spring expands and decreases in power.

In Fig. 1, the rig spring 10 is shown as a coiled compression spring reacting between the two upper ends of the segment levers to resiliently urge them to swing in opposite directions as denoted by the small curved arrows, and while this spring may be entirely exposed as shown in several of the drawing figures, it is here shown inclosed in a tube and surrounding a screw synchronizer and clutch brake. The spring is in two pieces—10 and 10' operating within telescopic tubes 32, 33, sealed against entrance of dust as by felt sealing rings 34. There is one of the smaller sections 33 of the telescopic tube at opposite ends of the outer section 32, each formed with a pivot lug 35 pivoted as at 36 to similar lugs or ears 37 carried by the upper ends of the segments.

Formed integral with the two smaller tube sections 33 are inwardly spaced sleeves 38 threaded internally with a high pitch or reversible pitch screw thread 39 thus forming tubular nuts loosely embraced around their outer sides by the springs 10. These tubular nuts are respectively right and left handed and engage over the similarly threaded ends of the synchronizing screw 11' which are correspondingly right and left hand threaded as indicated at 40 and 40', all so that as the tubular nut portions 38 are moved axially back and forth as the segments 5 and 5' oscillate slowly, it will cause the screw 11' to revolve, and force their synchronous movements.

The synchronizing screw is formed with a central enlargement 41 which may be termed a clutch or brake disk and which revolves freely between two fixed rings 42 spacedly secured in place within the larger telescopic tube 32 by any suitable means. The means here shown comprises making the tube 32 of two pieces tightly screwed into opposite ends of a collar 43 and with the rings 42 recessed into the ends of the tube sections and preferably soldered in place. The disk may be faced on opposite sides with an annular layer of any friction or brake material 44.

Collar 43 may be termed a brake or clutch housing as it carries the braking surface members 42, and it is prevented from rotating bodily by the stem 20 guided in hub boss 21, as previously explained. This radial guiding action compensates for the bodily displacement of the whole synchronizer-spring assembly toward and from the axis 1 as the segment levers oscillate during their compensating action on the control lines.

In the actual construction the wearing surfaces are bushed where required for long life, but as these features are common to all mechanisms they are not inventive and hence omitted for clarity.

Before describing the remaining drawing figures in detail it should be noted that the segment members 5 and 5' function as levers through which the control lines turn the shaft or hub with its work arm for transmission of the forces, or vice versa and that the greater the radius of the segments the longer is the lever involved. The arcuate periphery, if circular, forms a continuous length lever at all points of its arcuate travel, thus overcoming the falling off of the leverage of a straight lever at points on both sides of a position perpendicular to the pull of the cable attached to it. However there are cases where this is not a fault or might even be desirable, especially in compensating for diminishing rig spring force, and as such a segment lever as shown in Fig. 1 at 5, 5' includes in its substance all lesser degrees of arc down to a straight lever, it is obvious that the segment may be diminished in breadth or cut away until it leaves a simple straight lever as dotted at 5'' with the cable 8' attached to its outer end.

This illustration is made to justify the use of the specific term "lever" to include anything from simple straight lever to even a complete wheel; which is merely a rotary continuous lever and so functions for turning a shaft in any belt pulley.

In Figs. 1 and 2 the segments are indicated as being in the same plane, but this is unimportant, as they may be displaced side by side, and in several of the figures they are so indicated so that they can pass each other in their oscillatory movements.

In Fig. 1 the synchronizer is shown as a pair of female screws carried by the segment members rotating a male screw equipped with clutch or brake. It is obvious that these elements may be reversed, and they are so shown in Figs. 3 and 4.

Figure 3:
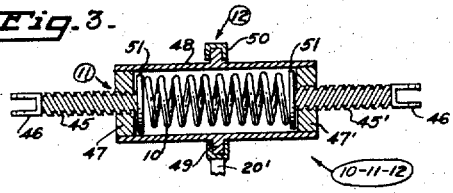
Fig. 3 is an enlarged cross sectional detail of the synchronizer, brake, and rig spring.
Figure 4:
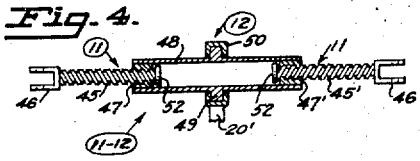
Fig. 4 is a view similar to that of Fig. 3 showing a modified construction.

In these Figs. 3 and 4 the two male screws are indicated respectively at 45, 45' provided with pivot lugs 46 for pivotally attaching them to the segments; as by the pins 36 of Fig. 1. These screws are respectively high pitch right and left hand threaded as decsribed for Fig. 1, but in Figs. 3 and 4 the nuts 47, 47' for the screws are secured respectively within opposite ends of a tube 48 as by soldering or otherwise, and which tube carries a clutch or brake ring 49 secured thereto just freely embraced by a clutch or brake strap 50 provided with a rigidly attached stem 20' corresponding to the guide stem 20 of Fig. 1 and for the same purpose. The clutch strap 50 is U-shaped in cross section and either it or the ring 49 or both may be lined with friction wear material as indicated at 44 for Fig. 1.

The operation of the synchronizer construction shown in Figs. 3 and 4 is the same as that shown in Fig. 1, for the axial movement of the screws 45 due to the oscillation of the segments will revolve the central member, the nuts 47 with their tube, and any appreciable disparity in axial movement between them will force the brake ring 49 hard against the clutch strap 50 and hold both segments against further oscillatory motion as long as any substantial unequal pull on the control lines is maintained.

The difference between Fig. 3 and Fig. 4 is that in Fig. 3 the rig spring 10 is shown as a compression coiled spring housed within tube 48 and reacting between two circular plates 51 bearing against the confronting ends of the screws 45, whereas in Fig. 4 the tube 48 is of smaller diameter and no rig spring is shown, as it may be otherwise used in the compensator, or sometimes omitted, tho stop disks 52 are shown secured to the inner ends of the screws to limit their outward axial movements.

A desirable feature on all forms of these control line compensators is a gage or scale to indicate the setting of the instrument, particularly the initial setting which should be made with regard to the existing temperature. This scale may be a mark on one member reading against an edge or mark on the oppositely movable member, but in Fig. 1 it is shown as overlapping arcuate leaves or strips 17, 17' secured respectively at one end each to the segments 5, 5' and with a scale 18 marked on the under one reading against a pointer 19 formed on the edge of a cut-out 19' on the other.

In the modified form shown in Fig. 5 the movable members 5, 5' are indicated as straight lever portions 52 each carrying an arcuate segment portion 53 at its outer end over which the control lines pass and extend to points adjacent the bases of the levers to which they are secured as at 54.

In this figure the synchronizer and brake unit 11—12 of Fig. 4 is shown incorporated, and the rig spring 10 is shown enclosed in a separate telescopic tube housing with its sections 55, 55' pivotally connected to the segments at 56. This figure also shows the work arm 4, hub 3 and clutch stem guiding boss 21' as formed integral, and with the hub keyed to the shaft 2 as at 57. Another feature clearly indicated in this figure is the offset or side by side relation of the segments or levers and with the work arm and hub between them.

In the variations of frame arrangement shown in Figs.

6 to 9 the main features are numbered as per list of parts given in column 5 and as their functioning has already been described their operation will be clearly understood, but they may be somewhat further described over the brief description in column 2 as follows.

In Fig. 6 the segment type levers are arranged with the rig spring 10 operating between two ends of the segments, and a screw synchronizer with brake 11—12 operating between the opposite ends, and with the brake stabilized by the work arm 4.

In Fig. 7 the work arm 4 is provided with oppositely extending lugs 58, 58' against each of which a rig spring 10—10' reacts to respectively urge one end of the segments 5—5' to swing in opposite directions, the segments being indicated as one directly behind the other or in intermediate position. The control lines 8, 8' are shown passing around guiding idler pulleys 59.

In Fig. 8 both levers 5 and 5' have oppositely extending lugs 60, 60' between opposite ends of which the rig spring 10 and the synchronizer-brake units 11—12 operate to control the movements of the levers as previously described. In this showing the levers have no arcuate outer peripheries but are plain levers with the control lines 8, 8' connected respectively to the ends of the levers as at 61, 61'.

Figure 9:
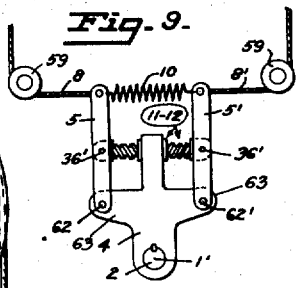
Fig. 9 shows a still further modified arrangement of the movable elements wherein the levers are simple straight levers pivoted at spaced points to a work arm in turn keyed to a shaft.

In Fig. 9 the apparatus has the same main features previously described and similarly numbered, but the levers 5, 5' are simple straight bars pivoted at spaced points 62, 62' upon lateral extensions 63 of the work arm 4. In this arrangement the work arm is shown keyed at one end to the shaft 2 as at 64 and with its opposite end stabilizing the synchronizer brake or clutch. The screw synchronizer is shown pivotally connected to the levers at 36' at points intermediate the length of the levers, and the rig spring 10 reacts between the outer ends of the levers, tho it is obvious that the positions of the synchronizer and rig spring may be reversed. This figure shows that the levers are not necessarily pivoted on a common center, and a later (Fig. 25) will show that the oppositely movable members need not strictly be levers at all, nor pivotally mounted, and that the word "levers" tho including all forms from a wheel to a simple straight radial piece carved from a wheel, is nevertheless a somewhat specific term to designate the oppositely movable members or "members" to which the control lines are applied.

In Fig. 9 the control lines 8 and 8' are, as in Fig. 7, shown passing around guiding idler pulleys 59.

Fig. 10 shows an arrangement of the previously described elements shaft 2, work arm 4, segment levers 5, 5', screw synchronizer 11, and brake 12 but in a different arrangement than heretofore described. In this figure the segments 5, 5' are pivotally connected by links 65 pivoted at 66 to the segments and at 67 to the ends of a rocker 68 which extends transversely through a transversely extending slot 69 formed through the work arm, and which rocker is itself pivoted as at 70 through an oppositely extending slot 71 formed in the work arm, all so that as the segments oscillate in compensating the control lines 8, 8' the rocker will be pushed up and down along the slots without rocking it if the opposite directional oscillation of the segments 5, 5' are in synchronism, and in the downward movement of the rocker it will push a high pitch threaded screw 11'' axially downward in a complementally threaded bore 72 formed in the work arm to cause the screw to revolve.

The screw 11' is hollow and is normally urged upward by a coiled spring 73 of lesser force than the rig spring 10. To permit free revolving of the screw beneath the rocker the screw is provided with a large disk head 74 recessed on top and a ball thrust bearing 74' is interposed below the rocker, and the lower edge of the rocker is formed with two heels 75 spaced apart to bring them against opposite margins of the disk 74, and also a central heel 76 which normally bears across the center of the ball bearing, all so that if the movement of the segments is not synchronous due to unequal stress on the control lines, the rocker will be tilted to bring its entire pressure upon the disk margin only, through the appropriate marginal heel 75, with a result in setting up sufficient friction against the disk to form a brake (12) so that the screw is effectually braked or clutched against turning and likewise against any further axial movement, until equilibrium is reestablished in the control lines. The arrangement will therefore be seen to function in the same manner as the previous arrangements of the principal elements already described. It may here be stated that in installing these compensators the rig tension is initially made uniform as by some adjusting means, such as turnbuckles interposed in the lines or in connecting or terminal linkage, as is well understood in the art, tho such adjustment may be incorporated in the regulator if desired, and one such incorporation of the line adjuster is shown in Fig. 10 where the ends of the cables 8, 8' are each suitably secured in a thimble rod 77 threaded along its exterior and embraced by a nut 78 positioned in a gap 79 formed in the rim of the segment. Other ways of securing the same result will occur to one skilled in the art.

[Figs. 11 to 16 which are about to be described vary from the preceding figures principally in the type of clutch used, and that the use of a positive or screw synchronizer is dispensed with and in its place the clutch includes a feature which requires that the segments or levers 5, 5' move synchronously but does not urge them to do as does the screw arrangement.]

[In Figs. 11 and 12 the general arrangement of segments and work arm is substantially like that of Figs. 6 and 7 and hence needs no further description.]

[In Fig. 13 the oppositely movable members 5, 5' are levers formed with intermediate lugs or arms 80, between which the rig spring reacts, and the work arm 4 is L-shaped and with the short leg 4' broadened and positioned between lever 5' and a wide extension of lever 5 to accommodate the clutch to be described for all Figs. 11 to 14.]

[In Fig. 14 the levers 5, 5' are S-shaped and positioned at opposite sides of the work arm 4 to which they are pivoted at 81, and with the rig spring 10 here shown as a tension coil spring connected at opposite ends to the arms to pull them toward one another to tension the control lines 8, 8'.]

[In all these four figures the clutch is a combined crossed guide gripping device which requires substantial synchronous opposite directional movement of the segments or levers or it will clutch them both together or both to the work arm, if used.]

[This clutch comprises a straight slot 82 through the work arm, and a pair of oppositely slanted slots 83, 83' or grooves 84, 84', one in each of the overlying segments or levers and which at the central position of the two levers cross at their centers and also cross the straight slot 82 at the same point, and at which point is loosely positioned a ball 85 or a pin 86, depending on whether the guides in the two outer members are grooves or slots.]

[In Figs. 11, 13 and 14 the crossed guides are grooves 84, 84' formed on the inner surfaces of the levers facing the slotted work arm, whereas in Fig. 12 the crossed guides are open slots 83, 83'.]

[Fig. 15 is an enlarged cross section of the ball type clutch taken along the line 15—15 of Fig. 11, while Fig. 16 is a similar cross section of Fig. 12 taken along the line 16—16 thereof.]

[The ball 85 may be an ordinary steel ball and it will roll back and forth along the straight slot in the work arm during synchronous operation of the levers, but if either lever is subjected to a greater pull from one of the control lines it forces the ball against the side of the grooves and slot and holds or substantially locks the three members together as long as such unbalanced stresses continue.]

[The arrangement of Fig. 12 operates precisely the same except that the pin instead of a ball becomes jammed in the crossed slots 83 upon any substantial unequal movement of the levers in opposite directions. In the cross section Fig. 16 the pin 86 is shown with a relatively large collar 87 pinned to each end to straddle the open slots, but obviously, as with the grooves 83 the slots 84 may be covered.]

Figure 17:
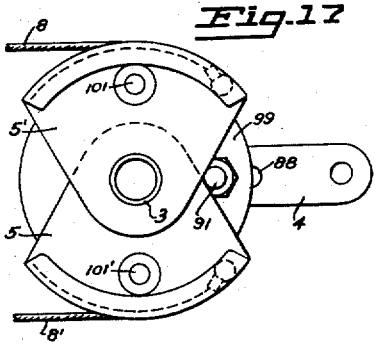
Figure 18:
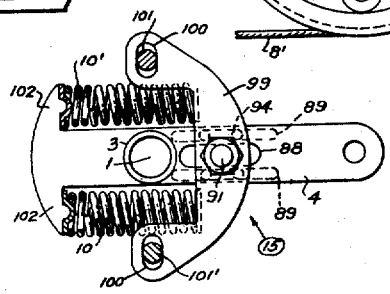

In Figs. *11* [17], [18] *12* and [19] *13*, a modified form of the ball and groove clutch is shown [, and which, while it may be applied to any of the structures of Figs. 11, 12, 13 or 14, in place of their cross guide clutches, it is shown in Figs. 17, 18 and 19 applied to a slightly modified structure more] to illustrate the mutability of the general form of the invention, while in Fig. 23 it is shown applied to a plain segment type of regulator.

This [variation of the] ball clutch comprises a plurality of balls seated part way in sockets in one or first member and partly in grooves in a confronting or second member so that any substantial turning of the members relatively will cause the balls to wedge against the edges of the sockets with a cam-like action to spread the members and thereby directly hold or lock the members against further relative turning movement, or the cam action may force one of the members in frictional contact with a third member to frictionally grip it also against turning. In the latter case the first member may be one of the segments or levers 5, or connection thereof, the second the arm 4, and the third the other segment 5', or connection thereof, and which latter arrangement will be particularly described for Figs. 23 and 24.

In Figs. *11* [17], [18] *12* and [19] *13* at present being described the usual elements of levers 5, 5' (of any form) work arm 4, and rig spring, are provided and the arm 4 is centrally longitudinally slotted as at 88, and surface grooved on both sides of the slot as at 89, the grooves being of a depth to receive about half of a ball, and a special arm 90 is provided which takes the form of a flat yoke with its central portion apertured and loosely pinned as at 91 to arm 4 through its slot 88 for free sliding back and forth therein as well as turning on the axis of the pin. On the face of this yoke confronting the arm 4 and in register with its two spaced grooves 89 are four sockets or depressions 92 (see Fig. *14* [20]) each of a depth equal to about half a ball, and in each of which sockets a ball 94 is seated and projects into a groove 89.

The short arms 90' of the yoke are each pivotally connected at their ends with one of the levers 5, 5' or extension thereof. In Figs. [17, 18] *11, 12* and *13* [19] this pivotal connection is shown as a pin 95 in one member and slot 96 in the other, to care for arcuate movements of the levers and bodily force the yoke to slide back and forth along the work arm 4 guided by its pin 91 and slot 88 connections therewith.

In place of the pin and slot connections 95, 96, the parts may be linked together as shown in Fig. *15* [21] to be later described and wherein the plate 97 is the equivalent of the yoke 90.

From the above description it will be seen that in normal compensating opposite directional oscillation of the levers, the yoke slides back and forth along the work arm, but upon an unbalanced pull on the control lines the yoke tilts slightly on axis 91 and the ball clutch grips or holds the entire assembly as a rigid unit, during such unbalanced pull only.

The enlarged cross section detail of this ball cam clutch (Fig. 14) shows the balls 94 positioned in grooves 89 and depressions or sockets 92 between the work arm 4 and the yoke 90. It may also be here noted that in assemblies where the work arm as such is not required, the part 4 of this view may be merely a block to transmit the cam pressure to opposite lever or segment member 5' or may itself be member 5', or 5. [as in Fig. 11.]

In Figs. [21] *15* and [22] *16* the construction is about the same as described for Figs. [17, 18 and 19] *11, 12* and *13*, except that the rigid yoke arm of those figures is replaced by a smaller plate 97 slidably pinned at 91 through a slot 88' in the work arm or extension 4' thereof, and there are two ball grooves 89', 89' in the arm on both sides of the slot, and eight balls 94' are used, each seated in suitable depression or socket 92' in the inner face of plate 97. Fig. *16* [22] shows two such plates 97 embracing opposite sides of the work arm 4' and with a set of balls and grooves at both sides as explained. The opposite ends of plate or plates 97 are pivotally linked as at 98, with levers 5, 5'.

In the showing of Fig [21] *15* the work arm 4 is formed integral with the hub 3 and work arm extension 4', and the levers 5, 5' have hub plates 30, 30'; like those shown in Fig. 1; except that they ride upon the hub 3 instead of the shaft shown in Fig. 1.

In Fig. *15* [21] the rig spring is indicated enclosed in a telescopic tube and with the tension equilibrium setting scale 18' formed on the tube sections.

In Figs. [23] *17* and [24] *18* the assembly is similar to that of Fig. *11* [17] except that the yoke designated 99 is positioned substantially within the contour of the segment type levers 5, 5' and with its short arms slotted as at 100 respectively connected to the segment levers by pins 101, 101'. In this showing there are two rig springs 10, 10' of the compression type reacting between laterally extending lugs 102 formed on the work arm 4 which extends across the axis 1 and also carries a hub 3 on which the segments ride.

The same type of ball cam clutch 15 is provided between yoke 99 and arm 4 as described for Figs. *11 or 15* [17 or 21] and is similarly numbered, and likewise, yoke 99 and clutch may be on but one side of the yoke arm or double and on both sides.

Figs. *19 and 20* [25 and 26] show a departure in the mounting of the oppositely movable members 5, 5' which are here shown as segments arranged side by side and they are arcuate both on their peripheries 6 where they are grooved at 7 to respectively guide the control lines 8, 8', as well as arcuate on their inner edges where they are arcuately slotted as at 103 to freely fit over arcuate tracks 104 along which they roll back and forth on rollers 105 in compensating the control lines.

The rollers 105 are mounted on pins 106 carried by the segments and which pins freely pass through arcuate slots 107 extending through the tracks.

The tracks may be formed integral with or secured to the rim 108 of a lever arm 109 and which corresponds to a combination of the work arm and hub of the other figures described, as the arm 109 may be any shape, or extend in any direction, or it may be used as a mounting bracket by bolt holes 110 for securing it to any rockable member, or for otherwise supporting the assembly if desired.

The arcuate segments of this Fig. [26] *20* receive the control lines or cables 8, 8' in their guiding grooves as explained for the other designs, and they are resiliently urged to move in opposite directions along their arcuate tracks by a rig spring 10—screw synchronizer 11—clutch 12 combination which may be and is shown precisely like the combinations 10—11—12 of Fig. 1, hooked at opposite ends as at 111, 111' respectively through end lugs 112, 112' extending downwardly from one end of each segment. The assembly rises and falls during the compensating action and this is cared for by the clutch stem 20' vertically guided in a boss 21'; corresponding to the boss 21 of Fig. 1; rigidly fixed in relation to the work arm 4 or 109. The main features of the control assembly 10—11—12 are therefore numbered to correspond with Fig. 1 and require no further description.

[Fig. 27 shows a modification of the screw synchronizer brake control (11—12) applied to a pair of lever type oppositely movable members 5, 5' especially adapted for operating rigid control lines, such as what are known as push-pull rods, 16, 16' respectively pivotally connected to the levers, from or to a single push-pull rod 16'', and all three of which rods are here shown with threaded nipple linear adjustment 113 for initial setting.]

[In this construction the levers 5, 5' are shown pivotally mounted on a shaft 2 or hub 3 of the work arm 4 and which work arm is pivotally connected as at 114 to rod 16'' which is here considered the operating rod, and the screw-brake combination 11—12 operates between lugs or laterally extending arms 115, 115' of levers 5, 5'. In this showing no rig spring is shown nor required, and the synchronizer hook up comprises two high pitch reversible screws 116, 116' respectively right and left hand, and pivoted at one end each to one of the lever lugs 115 as at 117 for axial movement of the screws in a tubular nut threaded at opposite ends to match the screws, and which nut is revolved one way or the other as the levers 5, 5' oscillate.]

[The tubular nut is preferably made of two threaded pieces 118, 118' soldered or otherwise fixedly secured in opposite ends of a larger tube 119 provided with flanges 120 at opposite ends which overlie the opposite edges of the work arm 4 but permit bodily revolving of the tube 119 as the screws are moved axially in opposite directions.]

[It is obvious that a friction washer may be interposed between the flanges and the work arm if desired to further limit the freedom of the tube to revolve.]

[In this showing, the bodily movement of the screw assembly toward and from axis 1, is compensated for by positioning the screw assembly in a slot formed in the outer end 4' of the work arm, as indicated at 121, or in any equivalent arrangement.]

[In operation of the compensator arrangement of Fig. 27, and, assuming push-pull rods 16, 16' to extend to opposite ends of an engine carbureter operating center-pivoted lever, the engine will be free at all times to bodily move toward and away from the fixed supporting axis 1 of the compensator, on the flexible mountings used on some aircraft installations, but will not affect the angular adjustment of the carburetor lever as both rods 16, 16′ will, in effect, be elongating or contracting equally and will revolve the screw nut.]

From the above description of numerous figures of the drawings and explanation of the fundamental operation common to all figures, and a detailed description of [three] species of the clutching or braking arrangement, and the sub-species thereof, it is manifest that many further modifications in detail are possible within the purview of the invention and any such are intended to be covered in the scope of my appended claims, and as every feature herein shown is the invention of applicant no disclaimer is intended nor to be implied through any lack of specific claims to any of the features shown and covered generally by the broader claims herein submitted.

I therefore claim:

1. A control line compensating device comprising a pair of relatively movable members, means mounting said members for arcuate movement [(,)] *about a common axis,* means for connecting a pair of force transmitting control lines respectively to said members, *spring means interposed between said members* in a manner for *causing* movement of said members only in opposite directions relatively as said control lines both lengthen or both shorten, and means *independent of said spring means* automatically [tending] *acting* to hold said members against such relative movement when one of said control lines is under *a tension in excess of that produced by said spring means* [substantially] [greater working stress than the other], *whereby both control lines move in unison to transmit control movements.*

[2. A control line compensating device comprising a pair of relatively movable members, means mounting said members for arcuate movement, means for connecting a pair of force transmitting control lines respectively to said members in a manner for movement of said members only in opposite directions relatively as said control lines both lengthen or both shorten, and means automatically tending to hold said members against such relative movement with respect to each other and to the mounting means when one of said control lines is under substantially greater tension than the other.]

3. A control line compensating device comprising a pair of relatively movable members (,) *having arcuate peripheries, spring means for urging said members to turn in opposite directions,* means for connecting a pair of force transmitting control lines respectively to *the peripheries of* said members, shaft supporting means mounting said members *and providing* for arcuate movement *thereof about a common axis under the action of said spring means, said members turning* in opposite directions relatively as said control lines lengthen or shorten, and means *independent of said spring means comprising a pair of links and a rocker member, said links having corresponding ends connected to said respective movable members and their other ends connected respectively to the ends of said rocker member for* reacting against said *shaft* supporting means *and* automatically [tending] *acting* to hold said members against relative movement when one of said control lines is under substantially greater tension than the other, and a work arm carried by said *shaft* supporting means.

4. A control line compensating device, comprising a pair of arcuate members, means mounting said members for arcuate relative movement [(,)] *about a common axis,* means for securing a control line to each of said members in a manner whereby the members will move in opposite directions when the lines are both pulled, *spring* means resiliently urging said members to move in opposite directions for tensioning both of the control lines, and means *independent of said spring means for* automatically holding said members from relative movement when one of said control lines is under *a tension in excess of that produced by said spring means* [substantially greater tension than the other].

5. A control line compensating device, comprising a pair of arcuate members, *supporting shaft* means mounting said members for arcuate relative movement[,] *about the common axis of said shaft means,* means for securing a control line to each of said members, means resiliently urging said members to move in opposite directions for tensioning the control lines, and means holding said members from relative movement when one of said control lines in under substantially greater tension than the other, *said means comprising a clutch and linkage for actuating said clutch from said members,* and a work arm carried by the mounting means.

[6. A control line compensating device, comprising of a pair of arcuate members, means mounting said members for arcuate relative movement, means for securing a control line to each of said members in a manner whereby the members will move in opposite directions when the lines are both pulled, means resiliently urging said members to move in opposite directions for tensioning both of the control lines, and means automatically holding said members from relative movement with respect to each other and to said means mounting said members when one of said control lines is under substantially greater tension than the other.]

[7. A control line compensating device, comprising a pair of levers, hub means pivotally mounting said levers for relative movement, means for connecting a pair of force transmitting control lines respectively to said levers, said levers arranged to move in an arcuate path in opposite directions relatively as both of said control elements lengthen or shorten, and means automatically holding said levers against relative movement, upon either control line being subject to a working stress substantially greater than the other.]

[8. A control line compensating device, comprising a pair of levers pivotally mounted on a common axis for relative movement, means for connecting a flexible control line to each of said levers in a manner whereby the levers will move in opposite directions when the lines are both pulled, means resiliently urging said levers in opposite directions relatively for normally tensioning both of the flexible control lines, and means automatically holding said levers against relative movement when one of said control lines is under substantially greater tension than the other.]

[9. A control line compensating device, comprising a pair of levers, hub means pivotally mounting said levers for relative movement, means for connecting a flexible control line to each of said levers, means resiliently urging said levers in opposite directions for normally tensioning the flexible control lines, and means automatically holding said levers to said hub means against relative movement when one of said control lines is under substantially greater tension than the other, and a work arm extending from said hub means.]

[10. A control line tension regulator comprising a pair of control line guiding members mounted for relative movement back and forth, spring means urging said members in opposite directions relatively, means for securing a pair of control lines one to each of said members for guiding thereby and in a manner for tensioning both lines by the opposite movement of said members by said spring means, and means automatically holding said members against relative movement during periods of unequal tension in said control lines.]

[11. A control line tension regulator comprising a pair of control line guiding members mounted for relative movement back and forth, spring means urging said members in opposite directions relatively, means for securing a pair of control lines one to each of said members for guiding thereby and in a manner for tensioning both lines by the opposite movement of said members by said spring means, and means automatically holding said members against relative movement during periods of unequal tension in said control lines, said members being pivotally mounted for such relative movement.]

12. A control line tension regulator comprising a pair of control line guiding members mounted for relative movement back and forth, spring means urging said members in opposite directions relatively, means for securing a pair of control lines one to each of said members for guiding thereby and in a manner for tensioning both lines by the opposite movement of said members by said spring means, and means automatically holding said members against relative movement during periods of unequal tension in said control lines, *said means comprising a clutch and linkage for actuating said clutch from said members,* said members being movably mounted about a common axis for such relative movement, and said members being of arcuate form remote from said axis and there provided with control line guiding grooves in which said control lines seat.

[13. A control line tension regulator comprising a pair of control line guiding members mounted for relative movement back and forth, spring means urging said members in opposite directions relatively, means for securing a pair of control lines one to each of said members for guiding thereby and in a manner for tensioning both lines by the opposite movement of said members by said spring means, and means automatically holding said members against relative movement during periods of unequal tension in said control lines, said members being substantially of segment form pivoted on a common axis for such relative movement and with arcuate outer peripheries along which the control lines are seated.]

14. A control line tension regulator comprising a pair of control line guiding members mounted for relative movement back and forth, spring means urging said members in opposite directions relatively, means for securing a pair of control lines one to each of said members for guiding thereby and in a manner for tensioning both lines by the opposite movement of said members by said spring means, and means *independent of said spring means comprising a pair of links and a rocker member, said links having corresponding ends connected to said respective members and their other ends connected respectively to the ends of said rocker member for* automatically holding said members against relative movement during periods of unequal tension in said control lines, said members being of arcuate form with control line guiding grooves along the arc in which said control lines are seated.

[15. A control line tension regulator comprising a pair of control line guiding members mounted for relative movement back and forth, spring means urging said members in opposite directions relatively, means for securing a pair of control lines one to each of said members for guiding thereby and in a manner for tensioning both lines by the opposite movement of said members by said spring means, and means automatically holding said members against relative movement during periods of unequal tension in said control lines, and means arcuately guiding said members in such relative movement.]

[16. In a construction as set out in claim 12 the arcuate control line guiding grooves being in non-concentric relation to said axis.]

17. In the construction as set out in claim 4 the means holding said members comprising a clutch, and a shaft to which said clutch is secured for rotation therewith.

18. In the construction set out in claim 4 the means holding said members comprising a clutch, a shaft upon which the clutch and said members are revolvable, and a work arm extending in fixed relation to said clutch for operating a control.

19. In the construction set out in claim 4 the means holding said members comprising a clutch, a shaft upon which the clutch and said members are revolvable, a work arm extending in fixed relation to said clutch, and a push-pull rod connected to said work arm.

[20. In a control line compensating apparatus, a pair of oppositely back and forth movable members to which a pair of control lines are respectively adapted to be attached, and screw means arranged and adapted to substantially synchronously control said members to move in opposite directions during their back and forth line compensating action.]

21. In a control line compensating apparatus, a pair of oppositely movable members to which a pair of control lines are respectively adapted to be attached, [and] screw means interposed between said members and operated by their relative back and forth movement *to lock said members against relative movement during control movements of said apparatus, and resilient means also interposed between said members and* arranged and adapted to substantially synchronously urge said members to move in opposite directions during their line compensating action.

22. In a control line compensating apparatus, a pair of oppositely movable members to which a pair of control lines are respectively adapted to be attached, and means *interposed between said members* arranged and adapted to substantially synchronously urge said members to move in opposite directions back and forth during their line compensating action, including a reversible pitch screw operating in a corresponding nut moved relatively axially by movement of said members.

23. In a control line compensating apparatus, a pair of oppositely movable members to which a pair of control lines are respectively adapted to be attached, and means *interposed between said members* arranged and adapted to substantially synchronously urge said members to move in opposite directions during their line compensating action, including a reversible pitch screw operating in a corresponding nut moved relatively axially by movement of said members, and means operated by substantial unequal movement of said members in opposite directions braking said screw and nut against relative movement.

24. In a construction as set out in claim 21, said screw means comprising an elongated reversible pitch threaded member carried by each of said oppositely movable members threadedly engaging an intermediately disposed complementally threaded member, and means braking relative rotation of the threaded members actuated by substantial unequal movement of said oppositely movable members.

25. In a construction as set out in claim 21, said screw means comprising an elongated reversible pitch threaded member carried by each of said oppositely movable members threadedly engaging an intermediately disposed complementally threaded member, and friction braking means operative on said intermediately disposed complementally threaded member actuated by substantial unequal movement of said oppositely movable members.

26. In a control line tension regulator comprising a pair of relatively movable frame members adapted each for attachment of a control line, *resilient means interposed between said members for producing regulating movements of said members,* a pair of screw threaded devices arranged in endwise confronting relation each secured at its remote end to one of said members, a complemental screw device threaded at opposite ends and with which said screw threaded devices respectively engage, said screw threaded devices being respectively right and left hand and the complemental screw device threads to match and the pitch of all threads being such as to cause the complemental screw device to revolve as the screw threaded devices are moved endwise back and forth by the regulating movement of said frame members.

27. In a control line tension regulator comprising a pair of relatively movable frame members adapted each for attachment of a control line, *resilient means interposed between said members for producing regulating movements of said members,* a pair of screw threaded devices arranged in endwise confronting relation each secured at its remote end to one of said members, a complemental screw device threaded at opposite ends and with which said screw threaded devices respectively engage, said screw threaded devices being respectively right and left hand and the complemental screw device threads to match and the pitch of all threads being such as to cause the complemental screw device to revolve as the screw threaded devices are moved endwise and means braking said complemental screw device against revolving actuated by unequal endwise movement of said screw threaded devices.

28. In a control line tension regulator comprising a pair of relatively movable frame members adapted each for attachment of a control line, a pair of spaced screws arranged in endwise confronting relation each secured at its remote end to one of said members, a nut-member threaded at opposite ends and into which said screws respectively engage, said screws being respectively right and left hand and the nut-member threads to match and the pitch of said screws and nut-member threads being such as to cause the nut-member to revolve as the screws are moved endwise back and forth by the regulating movement of said frame members *and spring means within said nut-member for urging said frame members apart.*

29. In a construction as set out in claim 4 the means holding said members comprising a right and a left hand screw respectively secured to the members and arranged in endwise confronting relation, a nut-member threadedly receiving the screws, the pitch of the screws being such as to cause turning of the nut-member as the screws are bodily moved axially, and means braking said nut-member against free turning upon relative variation in axial movement of said screws.

30. In a construction as set out in claim 4 the means holding said members comprising a right and a left hand screw respectively secured to the members and arranged in endwise confronting relation, a nut-member threadedly receiving the screws, tthe pitch of the screws being such as to cause turning of the nut-member as the screws are bodily moved axially, and means braking said nut-member against free turning upon relative variation in axial movement of said screws, and the means resiliently urging said members being a coil spring reacting between said screws.

31. In a construction as set out in claim 4, the means holding said members comprising a right and a left hand screw respectively secured to the members and arranged in endwise confronting relation, a nut-member threadedly receiving the screws, the pitch of the screws being such as to cause turning of the nut-member as the screws are bodily moved axially, and means braking said nut-member against free turning upon relative variation in axial movement of said screws, and the means resiliently urging said members being a coil spring reacting between said screws, and said nut-member being in part tubular and embracing said coil spring.

32. In a construction as set out in claim 4, the means holding said members comprising a right and a left hand screw respectively secured to the members and arranged in endwise confronting relation, a nut-member threadedly receiving the screws, the pitch of the screws being such as to cause turning of the nut-member as the screws are bodily moved axially, means carried by the means mounting said members braking said nut-member against free turning upon relative variation in axial movement of said screws, and a shaft supporting the assembly.

33. In a construction as set out in claim 4, the means holding said members comprising a right and a left hand screw respectively secured to the members and arranged in endwise confronting relation, a nut-member threadedly receiving the screws, the pitch of the screws being such as to cause turning of the nut-members as the screws are bodily moved axially, means carried by the means mounting said members braking said nut-member against free turning upon relative variation in axial movement of said screws, a shaft supporting the assembly, and an operating arm extending outwardly with respect to said shaft in fixed relation thereto.

34. In a construction as set out in claim 4 the means holding said members comprising a right and a left hand screw respectively secured to each member and arranged in endwise confronting relation, a nut-member threadedly receiving the screws, the pitch of the screws being such as to cause turning of the nut-member as the screws are bodily moved axially, means braking said nut-member against free turning upon relative variation of axial movement of said screws, the means braking said nut-member including friction surfaces rotatably carried by the nut-member, and cooperating friction surfaces carried by the means mounting said members.

[35. In a structure as set out in claim 1, the means tending to hold said movable members against opposite directional relative movement when the control line stresses on them are unequal, comprising a pair of crossed guides carried respectively by said members in confronting relation, and a movable device loosely housed in said guides in a manner to bind against the guides when either guide with its member is moved relatively more than the other guide with its member, due to such unequal control line stress.]

[36. In a structure as set out in claim 1, the means tending to hold said movable members against opposite directional relative movement when the control line stresses on them are unequal, comprising a pair of crossed guides carried respectively by said members in confronting relation, and a movable ball loosely housed in said guides in a manner to bind against the guides when either guide with its member is moved relatively more than the other guide with its member, due to such unequal control line stress.]

[37. In a structure as set out in claim 4, the means tending to hold said movable members against opposite directional relative movement when the control line stresses on them are unequal, comprising a pair of crossed guides carried respectively by said members in confronting relation, a work arm intermediate said movable members provided with a straight guide positioned between the crossed guides, and a movable device loosely housed in said guides in a manner to bind against the guides when either guide with its member is moved relatively more than the other guide with its member, due to such unequal control line stress.]

38. In a structure as set out in claim 1, the means *acting* [tending] to hold said movable members against opposite directional movement when the control lines are unequally stressed, comprising a clutch including a pair of plate portions moved relatively by said members and engaged by cam means therebetween upon unequal opposite directional movement only of said members.

39. In a structure as set out in claim 1, the means *acting* [tending] to hold said movable members against opposite directional movement when the control lines are unequally stressed, comprising a clutch including a pair of plate portions moved relatively by said members and engaged by ball cam means therebetween upon unequal opposite directional movement only of said members.

40. In a structure as set out in claim 4, the means holding the said movable members against opposite directional movement when the control lines are unequally stressed, comprising a clutch including a relatively fixed member intermediate said movable members, and ball cam means positioned between the movable members and the fixed member operated by unequal opposite directional movements of the movable members to hold the movable members and fixed member relatively immovable.

41. In a structure as set out in claim 4, the means holding the movable members against opposite directional movement when the control lines are unequally stressed comprising a clutch including a relatively fixed member intermediate said movable members, and ball cam means positioned between the movable members and the fixed member operated by unequal opposite directional movements of the movable members to hold the movable members and fixed member relatively immovable, said ball cam means including spaced balls positioned in indentations on the inner sides of said movable members, and straight channels formed on the sides of said relatively fixed member into which said balls project and are free to move back and forth only when the opposite directional movements of said movable members is substantially equal.

*42. In a structure as set out in claim 4, the means holding said arcuate members comprising a clutch including a rocker, links connecting said members to opposite ends of said rocker to tilt the latter and effect the operation of said clutch upon unequal tensions being applied to said control lines, and a work arm extending in fixed relation to said clutch for operating a control.*

*43. A control line compensating device comprising a pair of relatively movable members, means mounting said members for arcuate movement about a common axis, means for connecting a pair of force transmitting control lines respectively to said members, spring means connected for urging said members in a manner for movement of said members only in opposite directions relatively as said control lines both lengthen or both shorten, means automatically acting to hold said members against such relative movement when one of said control lines is under substantially greater working stress than the other, said means comprising a clutch having a rocker tiltable for engaging said clutch and links connecting the respective ends of said rocker to said respective movable members.*

References Cited in the file of this patent or the original patent

UNITED STATES PATENTS

| | | |
|---|---|---|
| 444,006 | Mason | Jan. 6, 1891 |
| 803,565 | Dina | Nov. 7, 1905 |
| 1,405,852 | Maag et al. | Feb. 7, 1922 |

(Other references on following page)

UNITED STATES PATENTS

| | | |
|---|---|---|
| 1,517,737 | Klasing | Dec. 2, 1924 |
| 2,131,556 | Edmonds | Sept. 27, 1938 |
| 2,142,364 | McInnerney | Jan. 3, 1939 |
| 2,212,823 | Bulk | Aug. 27, 1940 |
| 2,224,193 | Mahnken | Dec. 10, 1940 |
| 2,298,611 | Bruderlin | Oct. 13, 1942 |
| 2,371,130 | Cushman | Mar. 13, 1945 |

FOREIGN PATENTS

| | | |
|---|---|---|
| 564,812 | Great Britain | Oct. 13, 1944 |

OTHER REFERENCES

"Flight," pages 424–425, Oct. 17, 1946.